UNITED STATES PATENT OFFICE.

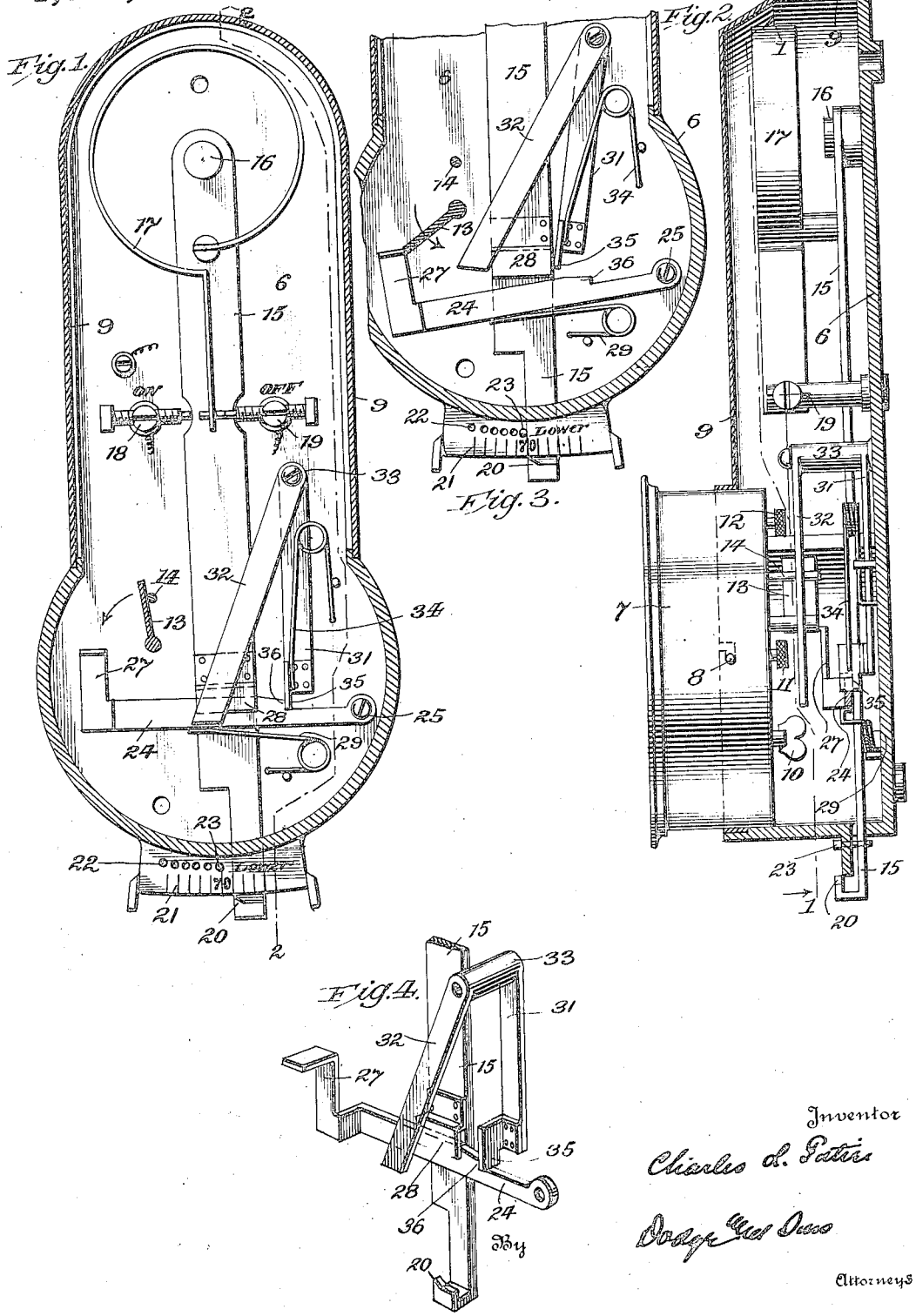

CHARLES L. FORTIER, OF MILWAUKEE, WISCONSIN, ASSIGNOR TO JOHNSON SERVICE COMPANY, OF MILWAUKEE, WISCONSIN, A CORPORATION OF WISCONSIN.

TIME-CONTROLLED THERMOSTAT OR THE LIKE.

1,419,667.  Specification of Letters Patent.  Patented June 13, 1922.

Application filed November 28, 1919. Serial No. 341,137.

*To all whom it may concern:*

Be it known that I, CHARLES L. FORTIER, a citizen of the United States, residing at Milwaukee, in the county of Milwaukee and State of Wisconsin, have invented certain new and useful Improvements in Time-Controlled Thermostats or the like, of which the following is a specification.

This invention relates to time controlled adjusting means for automatic controlling devices, and more particularly to time control of the adjustment of temperature regulating thermostats.

In general, it may be said that substantially all devices for maintaining a physical condition constant include a "responsive element" subject to change of form or dimension upon a change of the physical quantity sought to be maintained constant, and that this responsive element performs its regulative function by coacting with one or more relatively fixed "coactive members." As examples of responsive elements I may mention theremostatic bi-metallic bars, thermostatic diaphragms operated by volatile liquids; hygrostatic members such as wood blocks or hair and wire couples; pressure responsive devices such as Bourdon tubes, etc. As examples of "coactive members" I may mention electric contacts, and leak ports controlling a relay motor.

In each of various devices of the type specified, adjustment of the critical point, or point of regulative coaction, may be made by producing an adjustment of the relative positions of the responsive element and the coactive member. From this point of view all such devices may be regarded as equivalents, whether they be thermostats, hydrostats or pressure regulators, and whether the energy controlled thereby to actuate the regulative motor be electrical, pneumatic, hydraulic or other.

It is often necessary to set such devices to operate to maintain one value for a definite period, and then automatically to change to maintain another value. In prior devices for this purpose it has been usual to provide a single adjusting means and to cause a clock to move said adjusting means a stated amount at the desired time, but such prior devices have been difficult to set because they have included positive latches or detents which must be released before the adjustment could be made for either of the two values to be maintained thereby. Users frequently damage such devices by attempting to make adjustments without releasing the detents.

The present invention provides a single means for adjusting the relation between the responsive element and the coacting member. A primary adjustment is determined by an adjustable stop which may be set at any time without the release of any catches or detents and this stop determines the normal position of the adjusting means. A releasable friction brake is provided for holding the adjusting means away from this stop an amount proportional to the desired change in the controlled quantity. The adjusting means may therefore be set to any value and may be changed from one value to another at any time without the release of any catch or detent.

The clock element acts at the desired time, determined by an alarm train, to release the friction brake, force the adjusting means back against the stop and then reset the friction brake.

The invention is particularly applicable to furnace control thermostats capable of being set to maintain a reduced room temperature during the night and adapted automatically to shift in the early morning to a different adjustment, i. e., the normal adjustment corresponding to the temperature to be maintained throughout the day.

I illustrate such an embodiment of the invention in the accompanying drawings, in which:—

Fig. 1 is a section on the line 1—1 of Fig. 2, showing the device set to maintain a reduced night temperature;

Fig. 2 is a section on the line 2—2 of Fig. 1;

Fig. 3 is a fragmentary view similar to Fig. 1, but showing the resetting operation in progress;

Fig. 4 is a perspective view of the brake, the detent and the resetting mechanism.

6 represents the wall plate or base of the device formed at its lower end with a rounded opening to receive a clock 7. The clock is retained by any suitable means, for example, bayonet slots and pins indicated at 8 in the drawings. The upper part of the device is covered by a metal cover 9.

The clock 7 is of the conventional alarm type having a clock-winding key 10, time setting knob 11, and alarm setting knob 12 and an alarm winding key 13. This type of clock offers in convenient commercial form a time controlled motor (i. e., the alarm train) which may be used to actuate the detent release and resetting mechanisms. The alarm bell and hammer, being functionless in this mechanism, are omitted, and the alarm winding key 13 is formed as a single arm which serves as a striker to actuate the mechanism hereafter described. This key, as will be understood, turns when the alarm train is released. Key 13 is limited in its movement by a stop pin 14 which allows it to make not quite one complete turn, and before the pin 14 is set the alarm mechanism is wound up almost fully so as to stress the alarm spring strongly.

The thermostat adjusting arm is shown at 15. It is pivoted on a screw 16 and carries the responsive element which in this case is a thermostatic bi-metallic bar 17. The end of the bi-metallic bar 17 is formed with electric contacts which coact with the fixed contacts 18 and 19, of any convenient form, carried by the base plate 6 and insulated therefrom. The bar 17 may be, and usually would be, connected to ground through the base plate 6. This part of the mechanism is therefore merely a conventional electric thermostat.

The lower end of the lever 15 extends outward below the wall plate 6 and carries a pointer 20 which coacts with a dial 21. This dial has formed in it a series of holes 22 to receive a stop pin 23. This pin when inserted in any hole limits the movement of the lever 15 to the left and determines the normal or day temperature adjustment. The adjustment may be changed at any time by inserting the pin in a different hole and the holes are so spaced that the pointer 20 reads against corresponding graduations on the dial 21. It will be noted that the series of holes ends at about the middle of the range of movement of the lever 15 and that the lever may be moved to the right from the position determined by the stop pin 20 when inserted in any hole 22. This is for the night adjustment.

A horizontal lever 24 is pivoted at 25 near the lower end of the wall plate 6 and extends upward at 27 into the path of the arm 13 on the winding arbor of the alarm train of the clock. The lever 15 carries an overhanging spring plate 28 which embraces the upper edge of the lever 24 when the latter is in its extreme upward position, and this spring plate 28 serves as a releasable friction brake for retaining lever 15 in various adjusted positions to the right from the stop pin 23. The lever 24 is constantly urged upward by a spring 29 so that its normal position is in frictional engagement with the spring plate 28. Pivoted to a screw above the lever 24 is an off-set bell-crank lever comprising the arms 31 and 32 connected by the sleeve 33. This lever is urged to the left, i. e., in a clockwise direction by a spring 34 which bears against a combined spring seat and detent finger 35 fixed on the lower end of the arm 31. This detent finger engages behind a shoulder 36 on the upper face of the lever 24, so that the lever 24 serves as a latch to hold the bell crank lever, through engagement with the detent finger 35.

A reduced-temperature setting of the device is shown in Fig. 1. Assume that the clock has been removed, wound and set and that the alarm has been set for the desired time of operation. The winding key of the alarm train is turned until it is arrested by the stop 14 as indicated in Fig. 1, and will remain in such position until the alarm train is released by the time train. The clock is replaced, the arm 15 is then moved to the right until the pointer 20 indicates the desired reduction in temperature for the night. This amount is measured from the position determined by the hole in which pin 23 is inserted.

When the alarm train is released the arm 13 will turn and strike the extension 27 and force the lever 24 down. This will release detent finger 35 from the shoulder 36, and frictional spring plate or friction brake 28 from lever 24. This spring 34 will then swing the bell crank lever in a clockwise direction so that the arms 31 and 32 will both swing to the left suddenly. The detent finger 35 on arm 31 will strike the lever 15 and force it to the left until it is arrested by the stop pin 23, thus resetting the device for the day temperature. This position of parts is indicated in Fig. 3. As will be noticed, however, the continued rotation of the arm 13 will cause it to strike the arm 32 of the bell crank and force it to the right. This will carry the arm 31 far enough to allow detent finger 35 to enter behind detent shoulder 36, whereupon spring 29 will raise lever 24. This restores the frictional engagement between the levers 24 and 15, by means of the spring plate or friction brake 28.

Thereafter all that is necessary to repeat this cycle of operation is to remove the clock, rewind the alarm and the time trains of the clock, replace the clock and move the pointer 20 to the desired night temperature. Obviously the stop pin 23 may be adjusted at any time to determine the day temperature, and the lever 15 may be moved at any time to set the night temperature. It should be clearly understood, however, that the device begins to function to maintain the night temperature as soon as the pointer is moved from the day adjustment. After being set it may be reset to any other value without any manipulation of the device other than the movement of the pointer 20. Similarly, pin 23 may be moved to any value it is desired to maintain during the next day, before or after setting for night temperature. Detent finger 35 and shoulder 36 are so related and the limit of movement of lever 15 to the right is so fixed that the detent 35 cannot be forced far enough to the right by lever 15 to cause it to engage behind shoulder 36. Hence resetting must be performed by the arm 13.

The use of a friction brake for retaining the adjusting mechanism in its various adjusted positions, in combination with a mechanism which serves to release this brake during the shifting operation, offers marked advantages. It may always be adjusted with one hand, there is never any danger of bending the adjusting mechanism, and finally the friction brake imposes no load on the clock, so that it may be made heavy enough to preclude accidental changes of adjustment, without overloading the clock.

Since the invention is not limited to thermostats, but relates generally to automatic control devices having responsive elements; and since the invention is not limited to devices in which the control is by the use of electric connections, but may be applied to other types such as the familiar pneumatic thermostats and hygrostats, I use the terms "responsive element" and "coactive member" as generic terms in my claims, in the sense already defined in this specification.

What is claimed is:—

1. The combination of a responsive element; a coactive member; adjusting means for determining the relation between said element and member; a stop for determining the normal position of said adjusting means; a releasable friction brake for retaining said adjusting means away from said stop; a normally restrained spring urged member, adapted when released to force said adjusting means against said stop; and time controlled means for concurrently releasing said friction brake and said spring urged member.

2. The combination of a responsive element; a coactive member; adjusting means for determining the relation between said element and member; a stop for determining the normal position of said adjusting means; a releasable friction brake for retaining said adjusting means away from said stop; a normally restrained spring urged member, adapted when released to force said adjusting means against said stop; and a time controlled motor adapted concurrently to release said friction brake and spring urged member, and then to restore said friction brake and spring urged member to their conditions prior to such release.

3. The combination of a responsive element; a coactive member; adjusting means for determining the relation between said element and member; a stop for determining the normal position of said adjusting means; a spring urged member adapted when released to force said adjusting means against said stop; a latch adapted normally to restrain said spring urged member in a retracted position, but capable of being moved to release the same; a friction brake operative only in the restraining positions of said latch for holding said adjusting means; and time controlled means for forcing said latch from its restraining position.

4. The combination of a responsive element; a coactive member; adjusting means for determining the relation between said element and member; a stop for determining the normal position of said adjusting means; a spring urged member adapted when released to force said adjusting means against said stop; a latch adapted normally to engage and hold said spring urged member in a retracted position; a spring constantly urging said latch in a direction to cause it to engage; a friction brake for said adjusting means serving to produce frictional engagement between said means and said latch in the engaging position of the latter; and a time released member adapted when released to force said latch to disengaging position, then pass clear of said latch, and then engage said spring urged member and force it back to retracted position.

5. The combination of a responsive element; a coactive member; adjusting means for determining the relation between said element and member; a stop for determining the normal position of said adjusting means; a spring-urged lever, adapted when released to engage said adjusting means and force it against said stop; a latch adapted normally to engage said lever and hold it in a retracted position; a spring urging said latch in a direction to engage said lever; a friction brake member on said adjusting means serving to engage said latch only when the latter is in lever-engaging position; and a time controlled motor driven member adapted at a set time to move said latch to disengage said lever, then free the latch and then engage the lever, freed by the latch, and force it back to retracted position.

In testimony whereof I have signed my name to this specification.

CHAS. L. FORTIER.